G. F. L. KRIENKE, Jr.
SICKLE BAR FOR CUTTING PEPPERMINT.
APPLICATION FILED FEB. 14, 1918.
1,283,807.
Patented Nov. 5, 1918.
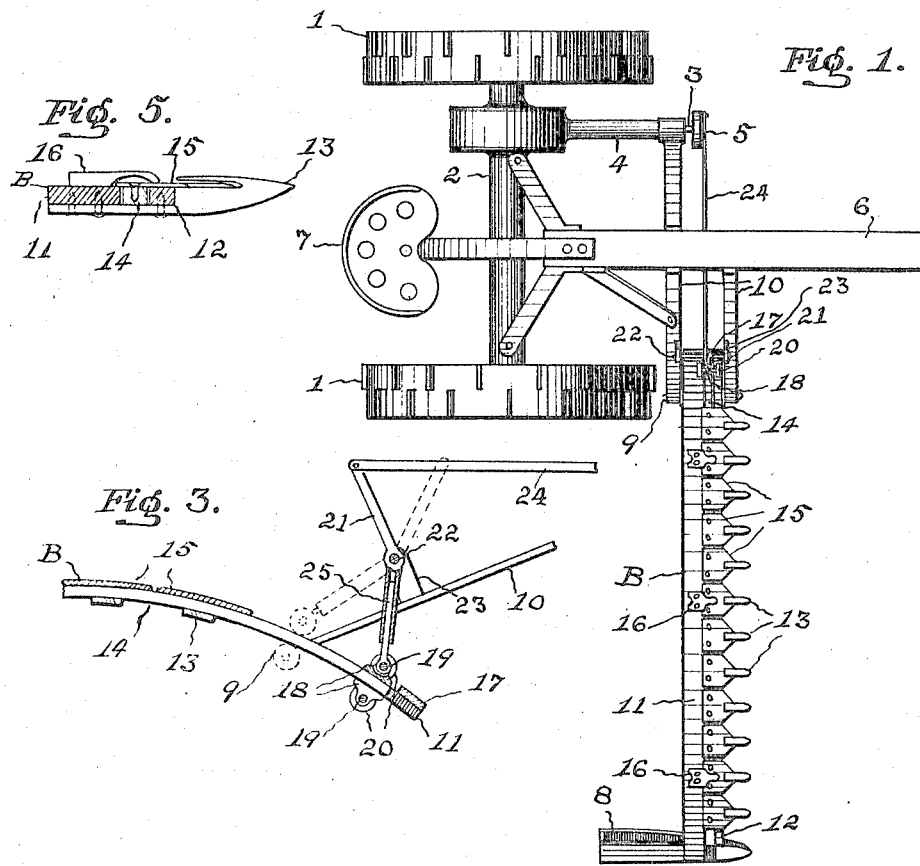
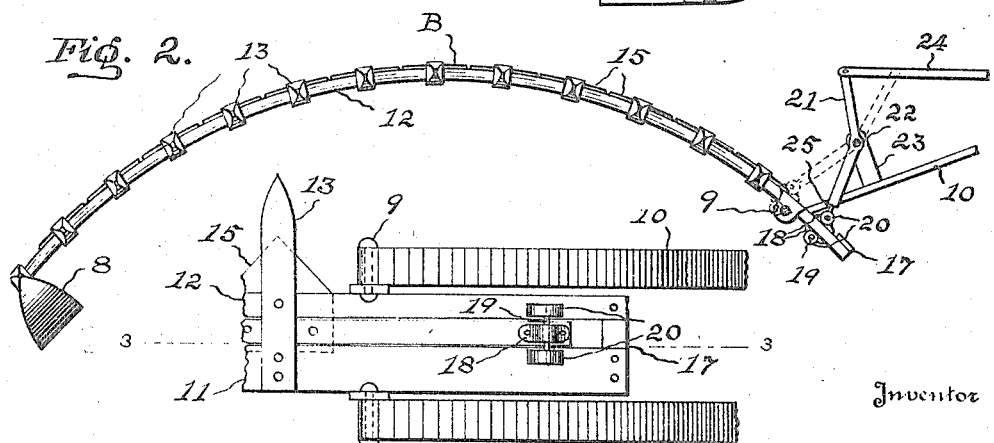
Inventor
G. F. L. Krienke Jr.
By N. S. Hill
Attorney

UNITED STATES PATENT OFFICE.

GUSTAV F. L. KRIENKE, JR., OF SOUTH BEND, INDIANA.

SICKLE-BAR FOR CUTTING PEPPERMINT.

1,283,807.

Specification of Letters Patent.

Patented Nov. 5, 1918.

Application filed February 14, 1918. Serial No. 217,041.

*To all whom it may concern:*

Be it known that I, GUSTAV F. L. KRIENKE, Jr., a citizen of the United States, residing at South Bend, in the county of St. Joseph, State of Indiana, have invented a new and useful Sickle-Bar for Cutting Peppermint; and I do hereby declare the following to be a full, clear, and exact description of the invention, such as will enable others skilled in the art to which it appertains to make and use the same.

The present invention relates to a mowing machine construction which embodies novel features of construction whereby it can be effectively used for cutting new peppermint and like crops that grow in ridges and can not be effectively cut by a mowing machine having a straight sickle bar. New peppermint that has been planted in the spring and cultivated all summer is of course in ridges, and this peppermint is ordinarily cut by hand, men with scythes going up on one side and down on the other. This manual cutting of peppermint is a slow and laborious operation and involves a great deal of expense, and it is the object of this invention to provide a machine which will perform the work in a satisfactory manner and enable one man to accomplish in a few hours what would otherwise require the labor of a large number of men for a full day.

With the above and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of a mowing machine provided with a sickle bar constructed in accordance with the invention.

Fig. 2 is a front elevation of the sickle bar.

Fig. 3 is an enlarged longitudinal sectional view through the inner end of the sickle bar, taken on the line 3—3 of Fig. 4.

Fig. 4 is a bottom plan view of the inner end of the sickle bar, and

Fig. 5 is an enlarged transverse sectional view through the sickle bar.

Corresponding and like parts are referred to in the following description and indicated in all the views of the drawings by the same reference characters.

The main frame and gearing of the mowing machine may be of any conventional construction, and that which is illustrated on the drawing is merely indicated as a diagrammatic showing. The numerals 1 designate the wheels which are rigidly connected to an axle extending through a housing 2, said axle being geared in a conventional manner to a forwardly extending shaft 3 which is journaled in a casing 4 and has a crank disk 5 at its forward end. The numeral 6 designates the conventional tongue and 7 a seat for the driver.

The sickle bar B is curved or arched longitudinally, as indicated more clearly by Fig. 2, so that it will span a ridge of peppermint or the like and cut the peppermint on both sides of the ridge as well as on the top thereof. A suitable shoe 8 is provided at the outer end of the sickle bar, while the inner end thereof may be pivotally connected at 9 to suitable brackets 10 projecting from the frame of the machine. The sickle bar includes a main bar 11 and a forward bar 12 which is spaced from the main bar and considerably narrower than the same, the said bars being held rigidly in a spaced position and carrying the usual guard fingers 13. The knife bar 14 is received between the bars 11 and 12 and carries the usual knife blades 15 which are arranged to coöperate with the guard fingers 13 and cut the peppermint or other crop being operated upon as the machine is advanced and the knife bar 14 reciprocated back and forth between the fixed bars 11 and 12. Suitable retaining fingers 16 are secured at intervals to the main bar 11 and overhang the knife bar 14, the extremities of these fingers bearing loosely against the upper faces of certain of the knives 15 and serving to retain the knife carrying bar in proper position between the fixed bars 11 and 12.

The inner ends of the fixed bars 11 and 12 are shown as rigidly connected by a cross bar 17, and the inner end of the knife bar 14 is provided with bearings 18 receiving short axles 19 upon which rollers 20 are journaled, said rollers engaging the upper and lower surfaces of the fixed bars 11 and 12 and serving to direct the knife carrying bar 14 in its back and forth movements so that it can be operated without binding. In transmitting power to the knife carrying bar 14 an upright lever 21 may be utilized, said lever being pivotally mounted at 22 at a point between its ends upon arms 23 projecting from the brackets 10, and the upper end thereof being connected by a pitman 24 to the crank disk 5 of the machine. The lower arm of the lever may be tubular and slidably receive a rod 25 which is connected to the knife carrying bar 14, in the present instance engaging the upper short shaft or axle 19. Power is thus transmitted to the knife carrying bar with a direct thrust or pull, so that binding and loss of power is avoided.

Having thus described the invention, what I claim as new and desire to secure by Letters Patent, is:—

1. A mowing machine including a sickle bar formed with spaced bars and curved longitudinally so as to arch over a ridge, guard fingers projecting laterally from one of the bars, a longitudinally curved cutter bar slidably mounted between the spaced bars, knife blades mounted on the cutter bar, bearings applied to the upper and lower faces of the cutter bar at one end thereof, transverse shafts extending through the bearings, rollers applied to the shafts and engaging the upper and lower faces of the spaced bars of the frame, an operating lever pivotally engaging one of the transverse shafts, and a pitman operatively connected to the operating lever.

2. A mowing machine including a sickle bar frame formed with spaced bars and guard fingers and curved longitudinally so as to arch over a ridge, a longitudinally curved cutter bar slidably mounted between the spaced bars of the frame, knife blades mounted on the cutter bar, bearings applied to upper and lower faces of the cutter bar at one end thereof, transverse shafts extending through the bearings, rollers applied to the shafts and engaging upper and lower faces of the spaced bars of the frame, an upright lever formed with telescoping sections, one of which is pivotally connected to one of the before mentioned shafts, and a pitman operatively connected to the other section of the upright lever.

In testimony whereof I have signed my name to this specification in the presence of two subscribing witnesses.

GUSTAV F. L. KRIENKE, Jr.

Witnesses:
LOUIS R. CHOERST,
MARION S. WESOLOWSKI.

Copies of this patent may be obtained for five cents each, by addressing the "Commissioner of Patents, Washington, D. C."